United States Patent
Nouchi et al.

(10) Patent No.: US 8,243,564 B2
(45) Date of Patent: Aug. 14, 2012

(54) MISJUDGMENT CORRECTION CIRCUIT AND OPTICAL DISK DRIVE

(75) Inventors: Shinya Nouchi, Kanagawa (JP); Kimimasa Senba, Kanagawa (JP); Kenichi Ishida, Kanagawa (JP)

(73) Assignee: Sony Corporation, Tokyo (JP)

(*) Notice: Subject to any disclaimer, the term of this patent is extended or adjusted under 35 U.S.C. 154(b) by 648 days.

(21) Appl. No.: 12/385,381

(22) Filed: Apr. 7, 2009

(65) Prior Publication Data

US 2009/0279396 A1 Nov. 12, 2009

(30) Foreign Application Priority Data

May 8, 2008 (JP) ................................. 2008-122556

(51) Int. Cl.
*G11B 7/00* (2006.01)

(52) U.S. Cl. ............... 369/44.13; 369/44.26; 369/47.53; 369/53.31; 369/100

(58) Field of Classification Search ............... 369/44.13, 369/47.17, 47.53, 30.14, 284, 53.31, 100, 369/44.26, 44.29

See application file for complete search history.

(56) References Cited

U.S. PATENT DOCUMENTS

| | | | | |
|---|---|---|---|---|
| 6,275,466 B1* | 8/2001 | Nagasawa et al. | ......... | 369/275.3 |
| 2002/0167874 A1* | 11/2002 | Hayashi | ..................... | 369/44.13 |
| 2004/0136284 A1* | 7/2004 | Sano et al. | ................. | 369/47.17 |
| 2004/0151084 A1* | 8/2004 | Ishikawa | .................... | 369/30.14 |
| 2006/0203646 A1* | 9/2006 | Oyama et al. | .............. | 369/47.53 |
| 2008/0062839 A1* | 3/2008 | Worthington et al. | ...... | 369/53.31 |
| 2008/0285431 A1* | 11/2008 | Minemura et al. | ............ | 369/284 |

FOREIGN PATENT DOCUMENTS

| | | |
|---|---|---|
| JP | 2000-113595 A | 4/2000 |
| JP | 2005-196846 A | 7/2005 |
| JP | 2005-332549 A | 12/2005 |
| JP | 2005-353195 | 12/2005 |
| JP | 2006-059447 A | 3/2006 |

OTHER PUBLICATIONS

Japanese Office Action issued Dec. 27, 2011 for corresponding Japanese Application No. 2008-122556.

* cited by examiner

*Primary Examiner* — Thuy Pardo
(74) *Attorney, Agent, or Firm* — Rader Fishman & Grauer, PLLC (57) ABSTRACT

Disclosed herein is a misjudgment correction circuit, including, an edge detection section configured to detect, in a binarized full addition signal obtained by adding first and second signals of the same or opposite polarity, edges at which the logic value of the binarized signal changes, a push-pull signal acquisition section configured to acquire a binarized push-pull signal obtained by subtracting the second signal from the first signal, a majority decision calculation section configured to acquire, in chronologic order, a plurality of logic values of the push-pull signal between the two adjacent edges so as to determine, by a majority decision, the more numerous of the two logic values, and a wave correction section configured to correct the push-pull signal between the edges to the more numerous logic value determined by the majority decision calculation section.

3 Claims, 9 Drawing Sheets

MISJUDGMENT CORRECTION CIRCUIT AND OPTICAL DISK DRIVE

FIELD OF THE INVENTION

The present invention relates to a misjudgment correction circuit and optical disk drive.

DESCRIPTION OF THE RELATED ART

In a typical recording optical disk, a wobble signal called wobble is recorded in advance on the grooves which serve as tracks to indicate the disk position and other information. For example, CD-R/RWs use 22.05 kHz as their basic frequency of the wobble signal. This frequency is sufficiently lower than the basic clock frequency of an RF signal to be recorded which is 4.3218 MHz. DVD-RWs, on the other hand, use 818 kHz as their frequency band of the wobble signal. This frequency band is close to the basic clock frequency of the RF signal which is 26.16 MHz.

One known method detects wobbles on an optical disk by calculating a push-pull signal component (A+D)−(B+C). The signals A, B, C and D originate from four separate photoreceiving sections of a PD (photodetector). Position information for recording and reproduction can be obtained by converting the detected wobble signal into address information with an address decoder. Here, an unrecorded area with no recorded RF signal contains almost no noise. Therefore, even in the presence of a difference in gain between channels (A+D) and (B+C), this gain difference will only turn into an offset. As a result, this will not cause any problem with the detection of a wobble signal.

In recorded areas where an RF signal is recorded, however, RF signal leakage will occur during wobble signal detection in the presence of a gain difference between the channels (A+D) and (B+C), thus resulting in degraded wobble signal characteristics.

To solve the foregoing problem, an AGC (Automatic Gain Control) circuit is disclosed in Japanese Patent Laid-Open Publication No. 2005-353195. The AGC circuit is designed to strike a balance in push-pull signal gain between different channels. The circuit includes two variable gain amplifiers configured to amplify the signals (A+D) and (B+C) from two separate photoreceiving elements with arbitrary gains. The circuit further includes two detectors configured to detect the output signals from the variable gain amplifiers. The circuit still further includes a comparator configured to compare the detection outputs and gain control means for controlling the gains of the variable gain amplifiers based on the comparison output from the comparator.

SUMMARY OF THE INVENTION

However, the prior art uses an AGC loop to ensure that the amplitudes of the signals (A+D) and (B+C) agree with each other. As a result, an AGC circuit is absolutely essential, resulting in a complicated circuit configuration. Further, components such as detectors and comparator are required for the AGC circuit, resulting in a complicated circuit configuration.

Still further, a GCA (Gain Control Amplifier) and LPF are required at the previous stage of the AGC to ensure accuracy in AGC operations. The GCA adjusts the signal amplitudes to a certain extent. The LPF removes high-frequency components. This leads to a larger circuit scale.

Still further, a wobble signal may contain error factors such as phase shift during detection, internal circuit noise and signal fluctuations. Therefore, these error factors must be positively eliminated before extracting a wobble signal.

The present invention has been made in light of the above problems, and an embodiment of the present invention to provide a new and improved misjudgment correction circuit and optical disk drive which can positively eliminate not only RF component but also noise, phase shift, signal fluctuations and other error factors from a wobble signal using a innovative and improved configuration.

According to an embodiment of the present invention there is provided a misjudgment correction circuit, including:

an edge detection section configured to detect, in a binarized full addition signal obtained by adding first and second signals of the same or opposite polarity, edges at which the logic value of the binarized signal changes;

a push-pull signal acquisition section configured to acquire a binarized push-pull signal obtained by subtracting the second signal from the first signal;

a majority decision calculation section configured to acquire, in chronologic order, a plurality of logic values of the push-pull signal between the two adjacent edges so as to determine, by a majority decision, the more numerous of the two logic values; and a wave correction section configured to correct the push-pull signal between the edges to the more numerous logic value determined by the majority decision calculation section.

According to another embodiment of the present invention there is provided an optical disk drive, including:

an optical pickup configured to irradiate light onto tracks of an optical recording medium so as to receive reflected light from the optical recording medium with two separate photoreceiving sections which are separated from each other in the direction in which the tracks extend;

an RF signal component acquisition section configured to acquire an RF signal component from at least either of first and second signals detected from the two photoreceiving sections;

a wobble signal acquisition section configured to acquire a wobble signal by subtracting the second signal from the first signal;

an RF signal component binarization section configured to binarize the RF signal component;

a wobble signal binarization section configured to binarize the wobble signal;

an edge detection section configured to detect edges at which the logic value of the RF signal component changes;

a majority decision calculation section configured to acquire, in chronologic order, a plurality of logic values of the wobble signal between the two adjacent edges so as to determine, by a majority decision, the more numerous of the two logic values;

a wave correction section configured to correct the wobble signal between the edges to the more numerous logic value determined by the majority decision calculation section;

an exclusive-ORing section configured to exclusive-OR the binarized RF signal component and wobble signal corrected by the wave correction section; and a balance adjustment section configured to adjust the balance in amplitude between the first and second signals based on the exclusive-ORing result of the exclusive-ORing section.

DETAILED DESCRIPTION OF THE PREFERRED EMBODIMENT

An embodiment of the present invention can positively eliminate not only RF component but also error factors such as noise, phase shift and signal fluctuations from a wobble signal using a simple configuration.

The preferred embodiment of the present invention will be described in detail below with reference to the accompanying drawings. It should be noted that components having substantially like functions are denoted by like reference numerals in the present specification and drawings, and redundant description thereof will be omitted.

Figure 1:
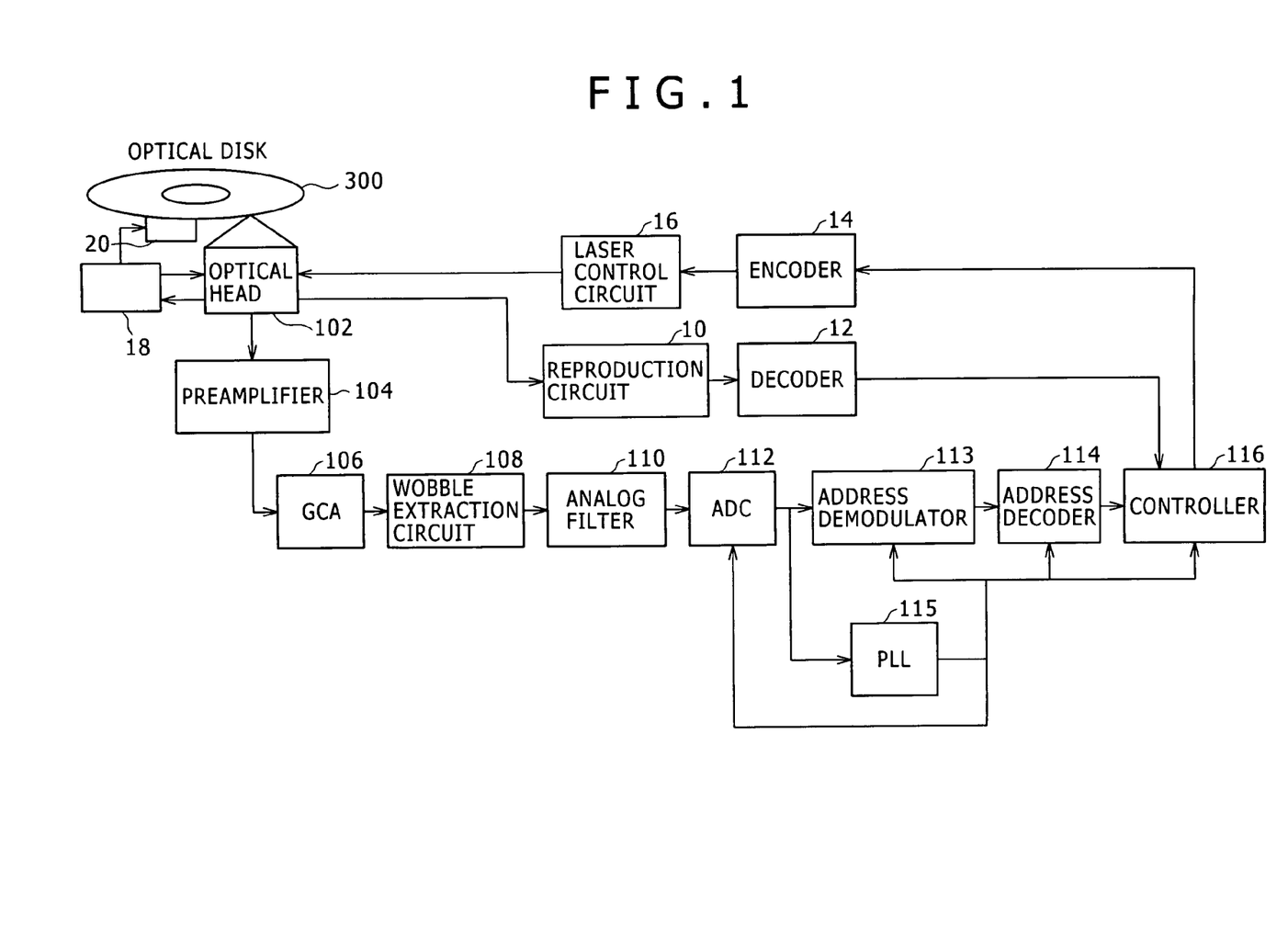
FIG. 1 is a schematic diagram illustrating the configuration of an optical disk drive according to an embodiment of the present invention.

FIG. 1 is a schematic diagram illustrating the configuration of an optical disk drive 100 according to an embodiment of the present invention. The optical disk drive 100 includes a wobble signal processing system. The wobble signal processing system includes an optical head (optical pickup) 102 configured to read the tracks of a disk-shaped recording medium 300. The wobble signal processing system also includes a preamplifier 104, GCA (gain control amplifier) 106, wobble extraction circuit 108, analog filter 110, AD converter (ADC) 112, address demodulator 113, address decoder 114, PLL (phase locked loop) 115 and controller 116.

Further, a reproduction circuit 10 is connected to the optical head 102. The reproduction circuit 10 handles processing including filtering and digitization of a reproduction signal detected from the disk-shaped recording medium 300. A decoder 12 configured to handle data format conversion is connected to the reproduction circuit 10, thus making up a signal reproduction system.

Still further, information to be recorded is transmitted from the controller 116 to an encoder 14 where the data format is converted. Then, a laser control circuit 16 controls light emission of the light source provided in the optical head 102 according to information bits. This allows for the information to be written to the disk-shaped recording medium, thus making up a signal recording system.

Still further, a servo signal is generated from the output signal detected from the photoreceiving elements of the optical head 102. A servo circuit 18 controls the position of the optical head 102 based on the servo signal. The servo circuit 18 also controls the rotation of a spindle motor 20 on which the disk-shaped recording medium 300 is placed.

An optical disk having wobbled tracks on its recording surface is used as the disk-shaped recording medium 300. The optical head 102 includes a light source such as laser diode and an objective lens configured to collect laser beams. The optical head 102 also includes photoreceiving elements configured to receive reflected light from the disk-shaped recording medium 300 and optics configured to guide reflected light onto the photoreceiving elements. The optical head 102 also includes actuators, configured to achieve focusing servo and tracking servo, and other components.

In the wobble signal processing system, the signal output from the optical head 102 and amplified by the preamplifier 104 undergoes an amplitude adjustment by the GCA 106 to fit into the dynamic range of the subsequent circuit. Then, the wobble extraction circuit 108 extracts a wobble signal, which is then fed to the analog filter 110. The analog filter 110 removes undesired low- and high-frequency components from the input signal. The reproduction signal (wobble signal), freed from undesired signal components by the analog filter 110, is fed to the AD converter (ADC) 112. The output signal from the AD converter (ADC) 112 is fed to the address demodulator 113. The address demodulator 113 detects a modulating signal of the input wobble signal to proceed with address modulation and outputs the resultant data to the subsequent address decoder 114. The address decoder 114 decodes an address from the demodulated data, reproduces address information of the access position and outputs the information to the controller 116. The controller 116 controls the signal reproduction and recording systems of the optical disk drive 100 based on the address information. The PLL (Phase Locked Loop) 115 is capable of generating a clock used by the circuits including the wobble extraction circuit 108, AD converter 112, address demodulator 113, address decoder 114 and controller 116.

Figure 2:
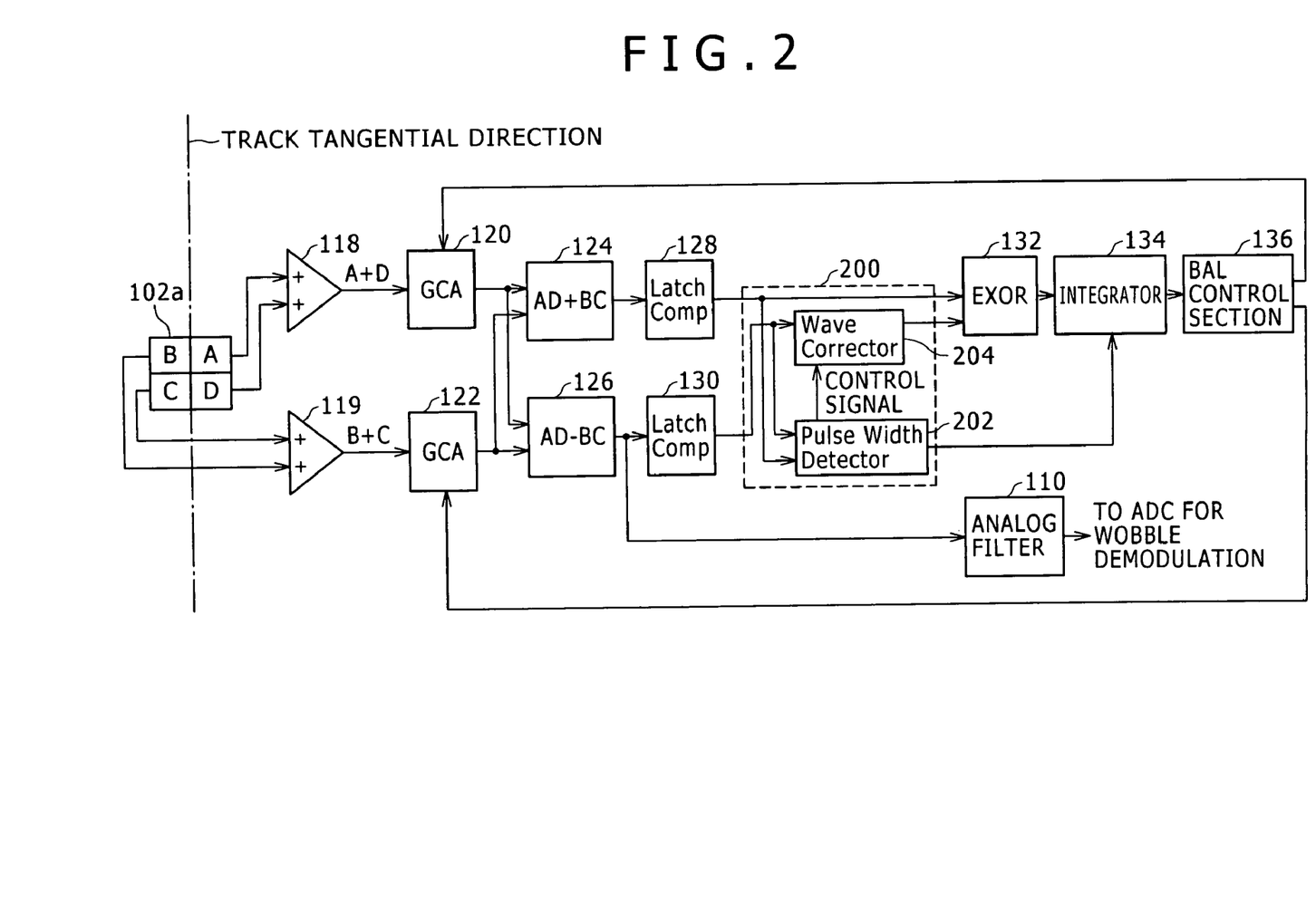
FIG. 2 is a schematic diagram illustrating in detail the configuration of a wobble extraction circuit and its peripheral circuits in the optical disk drive shown in FIG. 1.

FIG. 2 is a schematic diagram illustrating in detail the configuration of the wobble extraction circuit 108 and its peripheral circuits in the optical disk drive 100 shown in FIG. 1. Typically, recording media such as optical disk often use a wobbled track format to accurately detect the linear velocity at each radial position in advance. The optical disk drive 100 can access an arbitrary position of an unrecorded disk for recording or reproduction of information by reading these wobble signals.

As illustrated in FIG. 2, photoreceiving elements 102a of the optical head 102 have their photoreceiving areas separated into two parts in the direction in which the tracks extend (in the tangential direction of the tracks) so that reflected light of a light spot from the recording surface can be received. A PD (photodetector) having four separate photodetectors is used as the photoreceiving elements 102a to receive reflected light of a main spot. As illustrated in FIG. 2, photoreceiving sections A and D, one of the two separate photoreceiving areas, are disposed on one side of the tangential direction of the tracks. Photoreceiving sections B and C, the other of the two separate photoreceiving areas, are disposed on the other side thereof. The outputs from the photoreceiving sections A and D are fed to an adder 118. The adder 118 outputs a signal A+D. On the other hand, the outputs from the photoreceiving sections B and C are fed to an adder 119. The adder 119 outputs a signal B+C. A wobble signal can be obtained by detecting a push-pull signal component of a main beam or (A+D)−(B+C). It should be noted that the signals A+D and B+C are written as "AD" and "BC," respectively, as necessary in the drawings.

As illustrated in FIG. 2, the wobble extraction circuit 108 includes GCAs 120 and 122, an adder 124, a subtractor 126, latch comparators 128 and 130, an EXOR (exclusive OR) circuit 132, an integrator 134 and a BAL control section 136.

As illustrated in FIG. 2, the signal A+D is fed to the GCA 120 for gain adjustment. The signal B+C is fed to the GCA 122 for gain adjustment. The gain-adjusted signals A+D and B+C are both fed to the adder 124 and subtractor 126.

The adder 124 adds the signals A+D and B+C together to output a full addition signal R=A+B+C+D. On the other hand, the subtractor 126 subtracts the signal B+C from the signal A+D to output a push-pull signal ((A+D)−(B+C)), i.e., a wobble signal.

The full addition signal R=A+B+C+D is fed to the latch comparator 128. The latch comparator 128 is an analog comparator configured to binarize the AC component of the input signal based on the comparison of the input signal with a given value.

On the other hand, the wobble signal ((A+D)−(B+C)) is fed to the latch comparator 130. The latch comparator 130 is an analog comparator configured to binarize the input signal based on the comparison of the input signal with a given value.

The outputs of the latch comparators 128 and 130 are both fed to a push-pull wave correction block 200. The push-pull wave correction block 200 includes a pulse width detector 202 and wave corrector 204.

The output of the push-pull wave correction block 200 is fed to the EXOR circuit 132. Of all the inputs to the push-pull wave correction block 200, the binarized signal of the full addition signal R=A+B+C+D from the latch comparator 128 is fed to the pulse width detector 202. The binarized signal of the full addition signal R=A+B+C+D is also fed to the EXOR circuit 132 in an as-is manner. On the other hand, the binarized signal of the wobble signal ((A+D)−(B+C)) from the latch comparator 130 undergoes removal of error factors by the push-pull wave correction block 200 before being fed to the EXOR circuit 132. The wave correction performed by the push-pull wave correction block 200 will be described in detail later.

The EXOR circuit 132 exclusive-ORs the binarized full addition signal and wobble signal. Therefore, the EXOR circuit 132 outputs a low (L) signal when the full addition signal R=A+B+C+D and wobble signal ((A+D)−(B+C)) are of the same phase. The EXOR circuit 132 outputs a high (H) signal when the two signals are of opposite phase.

The output of the EXOR circuit 132 is fed to the integrator 134 where the integral of the binarized signal from the EXOR circuit 132 is calculated.

The output of the integrator 134 is fed to the balance (BAL) control section 136. The BAL control section 136 outputs gain balance control signals configured to adjust the gains of the GCAs 120 and 122 based on the output of the integrator 134. The control signals from the BAL control section 136 are fed respectively to the GCAs 120 and 122, thus forming a feedback loop for gain adjustment. The GCAs 120 and 122 are circuits configured to adjust the gains according to the digital code input. These circuits perform feedback control of the gains based on the control signals from the BAL control section 136.

The BAL control section 136 outputs control signals, inverted from each other, to the GCAs 120 and 122, respectively. The sum of the gains of the GCAs 120 and 122 controlled by the balance control section 136 is maintained constant. That is, when a control signal is output to one of the GCAs 120 and 122 to increase the gain thereof, a control signal is output to the other of the GCAs 120 and 122 to reduce the gain thereof.

Figure 3A:
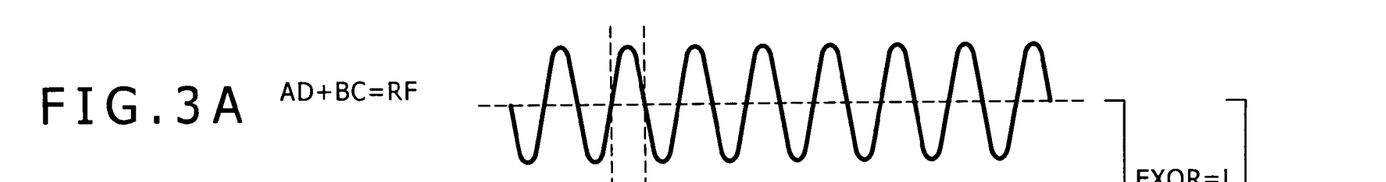
FIGS. 3A to 3D are characteristic diagrams illustrating the waveforms of a full addition signal from an adder and a signal from a subtractor.

FIGS. 3A to 3D are characteristic diagrams illustrating the waveforms of a full addition signal from the adder 124 and a wobble signal from the subtractor 126. Here, FIG. 3A illustrates the waveform of the full addition signal from the adder 124. The signals (A+D) and (B+C) contain RF signal (recording signal) components of the same phase. Therefore, the full addition signal obtained by adding the signals (A+D) and (B+C) together is of the same phase as the original RF signal contained in the signals (A+D) and (B+C). It should be noted that although an RF signal component is obtained here by adding the signals (A+D) and (B+C) together, an RF signal component may be obtained from either of the signals (A+D) and (B+C), or from one of the signals A, B, C and D.

Figure 3B:
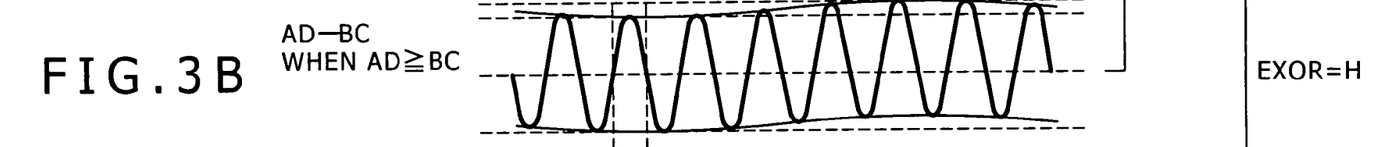
Figure 3C:
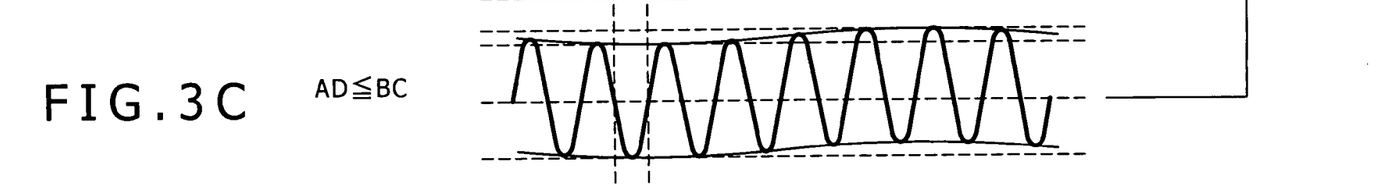
Figure 3D:
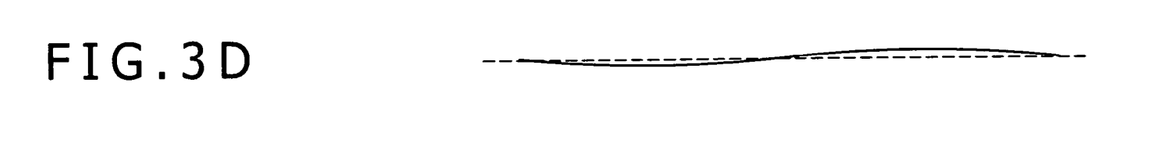

FIGS. 3B and 3C illustrate the waveforms of the wobble signal from the subtractor 126 to show that the signals (A+D) and (B+C) differ in amplitude from each other. Here, FIG. 3B illustrates a case in which (A+D)>(B+C), and FIG. 3C a case in which (A+D)<(B+C). As described above, the signals (A+D) and (B+C) contain RF signal components of the same phase. Therefore, if the signal (A+D) is larger or smaller than the signal (B+C) due to imbalance in amplitude, an RF signal component of the same or opposite phase to the RF signal leaks into the wobble signal according to the imbalance in amplitude. On the other hand, FIG. 3D illustrates a wobble signal whose gain has been adjusted by the GCAs 120 and 122 so that the signals (A+D) and (B+C) are equal in amplitude.

As illustrated in FIGS. 3A and 3B, when (A+D)≧(B+C), the RF signal component of the same phase as the full addition signal leaks into the wobble signal, causing the full addition signal to be of the same phase as the wobble signal. In this case, the output from the latch comparator 128 is of the same phase as the output from the latch comparator 130. As a result, the output from the EXOR circuit 132 is low (L).

As illustrated in FIGS. 3A and 3C, on the other hand, when (A+D)<(B+C), the RF signal component of opposite phase to the full addition signal leaks into the wobble signal, causing the full addition signal to have opposite phase to the wobble signal. In this case, the output from the latch comparator 128 is of opposite phase to the output from the latch comparator 130. As a result, the output from the EXOR circuit 132 is high (H).

This permits determination of the balance in amplitude (magnitude relationship) between the signals (A+D) and (B+C) based on the output from the EXOR circuit 132, thus allowing to determine which of the two signals is greater or smaller in amplitude than the other. When the relationship in amplitude between the signals (A+D) and (B+C) is found, it is possible to strike a uniform balance between the amplitudes of the two signals by applying feedback control in such a manner as to eliminate the imbalance. More specifically, the amplitudes of the signals (A+D) and (B+C) can be controlled to a similar level by changing the gains of the GCAs 120 and 122 based on the magnitude relationship between the signals (A+D) and (B+C). By keeping the amplitudes of the signals (A+D) and (B+C) in balance, it is possible to control the mean RF component of the wobble signal ((A+D)−(B+C)) to zero. This in turn ensures secure elimination of the RF signal component from the wobble signal as illustrated in FIG. 3D.

The output from the EXOR circuit 132 is fed to the integrator 134 for integration over a given period of time. When a low (L) signal is output from the EXOR circuit 132 based on the output from the integrator 134, then (A+D)≧(B+C). Therefore, the BAL control section 136 outputs a gain balance control signal, configured to reduce the gain, to the GCA 120 which receives the signal (A+D). At the same time, the BAL control section 136 outputs a gain balance control signal, configured to increase the gain, to the GCA 122 which receives the signal (B+C).

Further, when a high (H) signal is output from the EXOR circuit 132 based on the output from the integrator 134, then (A+D)<(B+C). Therefore, the BAL control section 136 outputs a gain balance control signal, configured to increase the gain, to the GCA 120. At the same time, the BAL control section 136 outputs a gain balance control signal, configured to reduce the gain, to the GCA 122.

As described above, the BAL control section 136 outputs binary coded control signals, inverted from each other, respectively to the GCAs 120 and 122. In the GCAs 120 and 122, therefore, the gains are adjusted so that the amplitudes of the signals (A+D) and (B+C) approach each other. This makes it possible to control the amplitudes of the signals (A+D) and (B+C) to a similar level.

The wobble signal feedback-controlled as described above is fed from the subtractor 126 to the analog filter 110, and then to the AD converter 112 for wobble demodulation. In the present embodiment, the magnitude relationship between the signals (A+D) and (B+C) is determined based on the wobble signal. Therefore, the RF component can be eliminated from the wobble signal based on the determination result using the wobble signal itself. This ensures secure elimination of the RF component from the wobble signal than processing the wobble signal based on other characteristic values, thus putting the wobble signal into the best possible condition.

Particularly problematic of all the frequency components of the RF signal leaking into the wobble signal are those close to the frequency band of the wobble signal. For example, therefore, high-frequency components outside the frequency band of the wobble signal may be removed in advance with filters so that exclusive-ORing is performed for gain adjustment based on low-frequency RF components close to the frequency band of the wobble signal. In this case, high-frequency cutting filters are inserted, for example, one before the adder and another before the subtractor. Alternatively, filters may be inserted, one before the latch comparator 128 and another before the latch comparator 130. The frequencies to be cut by the filters can be selected as appropriate based on the frequency band of the wobble signal.

The BAL control section 136 outputs control signals to the GCAs 120 and 122. However, the BAL control section 136 may output a control signal to only one of the GCAs 120 and 122 so that the gain of either the signal (A+D) or (B+C) is adjusted. Also in this case, the amplitudes of the signals (A+D) and (B+C) can be controlled to a similar level using feedback control. It should be noted that, in this case, the sum of the gains of the GCAs 120 and 122 is not a constant. Therefore, the gain of either of the signals (A+D) and (B+C) may be a fixed value. However, differential operation performed by feeding control values to both the GCAs 120 and 122 provides smaller amplitude variation during feedback control.

According to the above configuration, exclusive-ORing the binarized RF component (full addition signal) and binarized wobble signal allows for detection of which of the signals (A+D) and (B+C) is greater or smaller than the other. By applying feedback control based on the above, it is possible to strike a uniform balance between the amplitudes of the two signals, thus allowing for extraction of the wobble signal with high accuracy. Further, no AGC loop is required to ensure that the amplitudes of the signals (A+D) and (B+C) match. This permits downsizing of the balance control circuit, thus contributing to reduced manufacturing cost.

Further, the balance in amplitude can be controlled based on the outputs of the latch comparators 128 and 130 respectively configured to binarize the full addition signal and wobble signal. This eliminates the need for the GCA configured to meet the dynamic range of the AGC circuit and the LPF configured to smooth the RF signal waveform. Further, large dynamic and gain ranges were required for the prior art AGC circuit to ensure that the amplitudes of the signals (A+D) and (B+C) match. With the above configuration, however, it is only necessary to control the balance between the signals (A+D) and (B+C), thus minimizing the gain range of the gain control circuit.

Still further, all signal processing for the balance detection and control following binarization can be implemented by logic circuits. This contributes to smaller circuit scale as compared to analog signal processing, thus ensuring better compatibility with CMOS (Complementary Metal Oxide Semiconductor) system LSIs (Large Scale Integration). Still further, the comparator circuits can be readily rendered offset-free in the CMOS process. The above configuration is also compatible with the CMOS process in this regard. Still further, because any imbalance can be detected from the residual RF component following wobble extraction, the balance can be controlled to ensure minimal residual RF component, thus providing improved wobble signal quality.

Figure 4A:
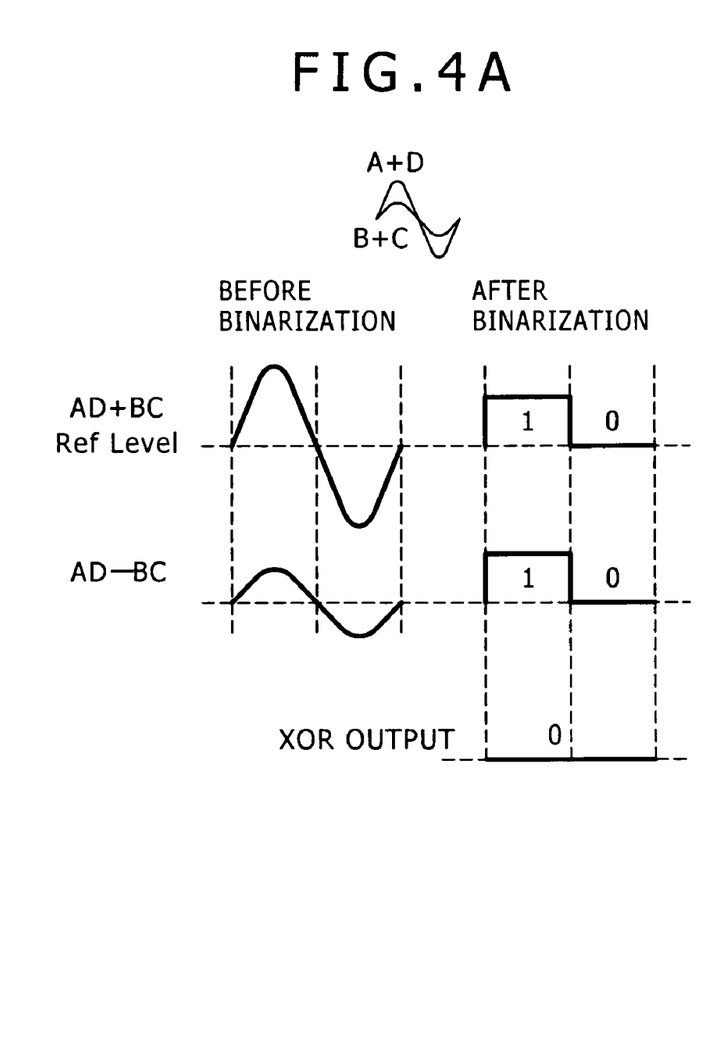
FIGS. 4A and 4B are characteristic diagrams illustrating ideal waveforms of the full addition and wobble signals before and after binarization.
Figure 4B:
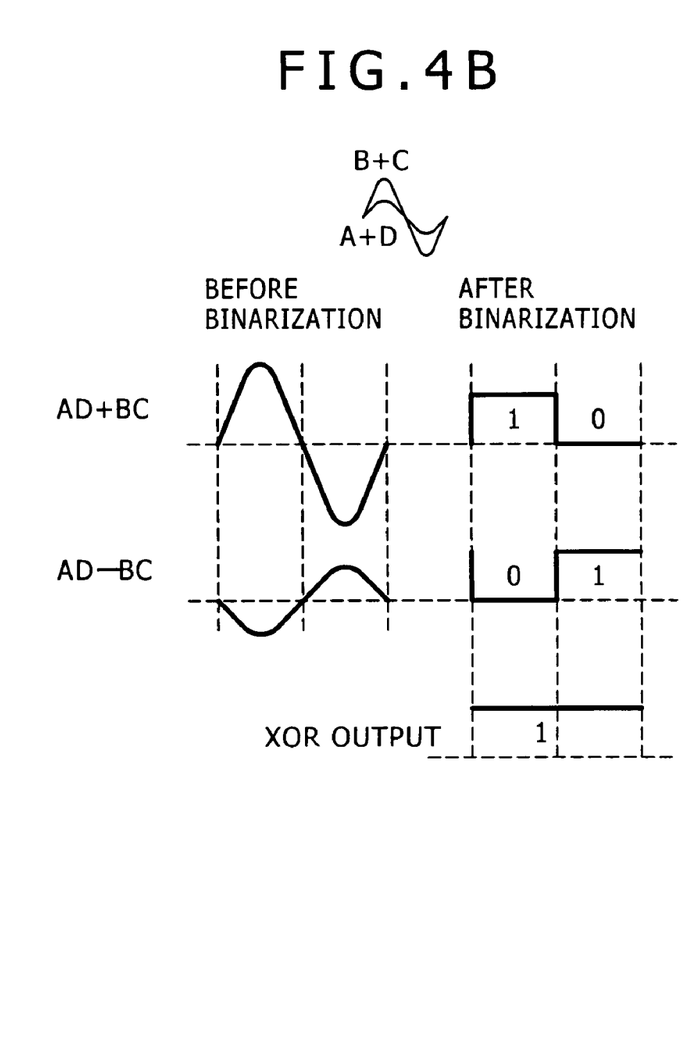

A detailed description will be given next of the wave correction performed by the push-pull wave correction block 200. A wobble signal may contain error factors such as phase shift, circuit noise and signal fluctuations. FIGS. 4A and 4B illustrate the full addition signal R=A+B+C+D and wobble signal ((A+D)−(B+C)) before and after the binarization by the latch comparators 128 and 130. Here, FIG. 4A illustrates a case in which (A+D)≧(B+C), and FIG. 4B a case in which (A+D)<(B+C). FIGS. 4A and 4B show ideal waveforms of the two signals free from error factors such as phase shift, circuit noise and signal fluctuations. As illustrated in FIGS. 4A and 4B, when the waveforms are ideal, the full addition signal and wobble signal after the binarization make a high-to-low or low-to-high transition at the same time. Therefore, the EXOR circuit 132 stably outputs low level (0) and high level (1) signals respectively when (A+D)≧(B+C) and (A+D)<(B+C).

Figure 5A:
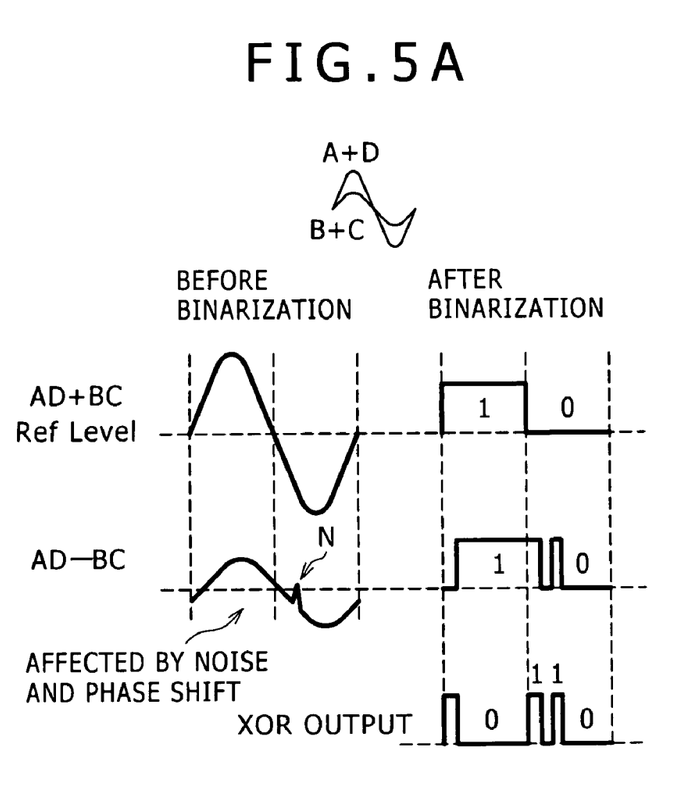
FIGS. 5A and 5B are characteristic diagrams illustrating waveforms of the full addition and wobble signals in practical circuits before and after binarization.
Figure 5B:
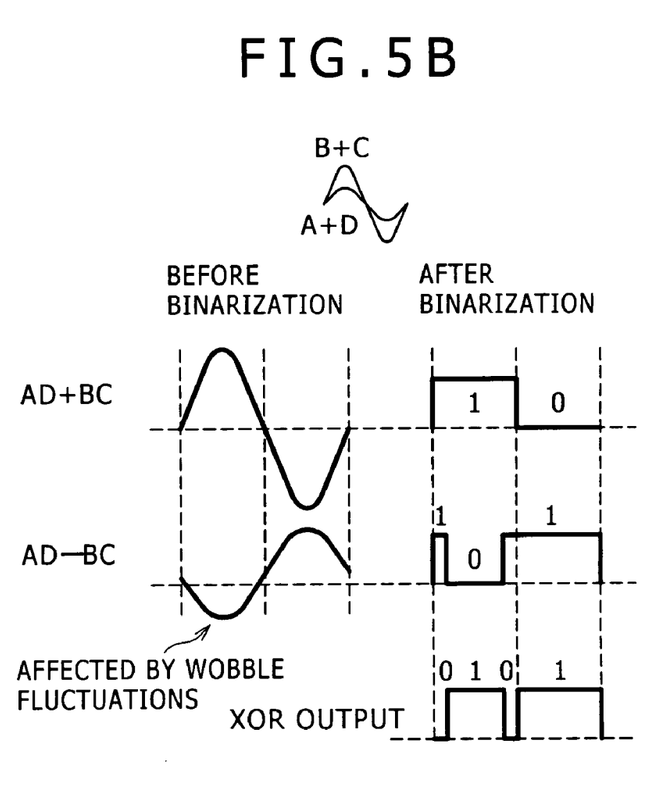

On the other hand, FIGS. 5A and 5B illustrate signal waveforms obtained from practical circuits, showing a case in which an error factor caused, for example, by phase shift, circuit noise or signal fluctuations has occurred in the wobble signal. Here, FIG. 5A illustrates a case in which (A+D)≧(B+C), and FIG. 5B a case in which (A+D)<(B+C), as in FIGS. 4A and 4B. In the example shown in FIG. 5A, the wobble signal has a phase shift and noise N. As a result, the full addition signal after the binarization makes a high-to-low transition at a different time from when the wobble signal after the binarization makes a high-to-low or low-to-high transition. Further, part of the wobble signal output after the binarization which should originally be low (0) is high (1) because of the noise N.

In the example shown in FIG. 5B, on the other hand, the wobble signal fluctuates, pushing up (shifting to the positive side) the center of the amplitude. As a result, part of the wobble signal output after the binarization which should originally be low (0) is high (1).

As illustrated in FIGS. 4A and 4B, when the full addition signal is high (1) or low (0), the value of the wobble signal originally does not change. In the presence of error factors as illustrated in FIGS. 5A and 5B, however, the wobble signal changes in value at a time when the full addition signal does not. As a result, the full addition signal and wobble signal make a high-to-low or low-to-high transition at different times. In the case of FIGS. 5A and 5B, a high (1) signal is output temporarily when a low (0) signal should originally be output, and a low (0) signal is output temporarily when a high (1) signal should originally be output, making it impossible to transmit accurate signals to the integrator 134 at the subsequent stage. This hinders the integral from decreasing in one direction. Instead, the integral may increase or decrease depending on error factors. This requires time for the balance to converge. In particular, the fluctuation of the wobble signal occurs only on the side of the push-pull signal. As a result, the wobble signal fluctuation can have a significant impact as an error factor if it occurs when the signals (A+D) and (B+C) are about to become balanced.

In the present embodiment, therefore, the push-pull wave correction block 200 performs wave correction to ensure reduced error factors, thus bringing the signal waveforms from the practical circuitry close to the ideal ones as illustrated in FIGS. 4A and 4B. A description will be given below of the wave correction with reference to FIGS. 6 and 7.

Figure 6:
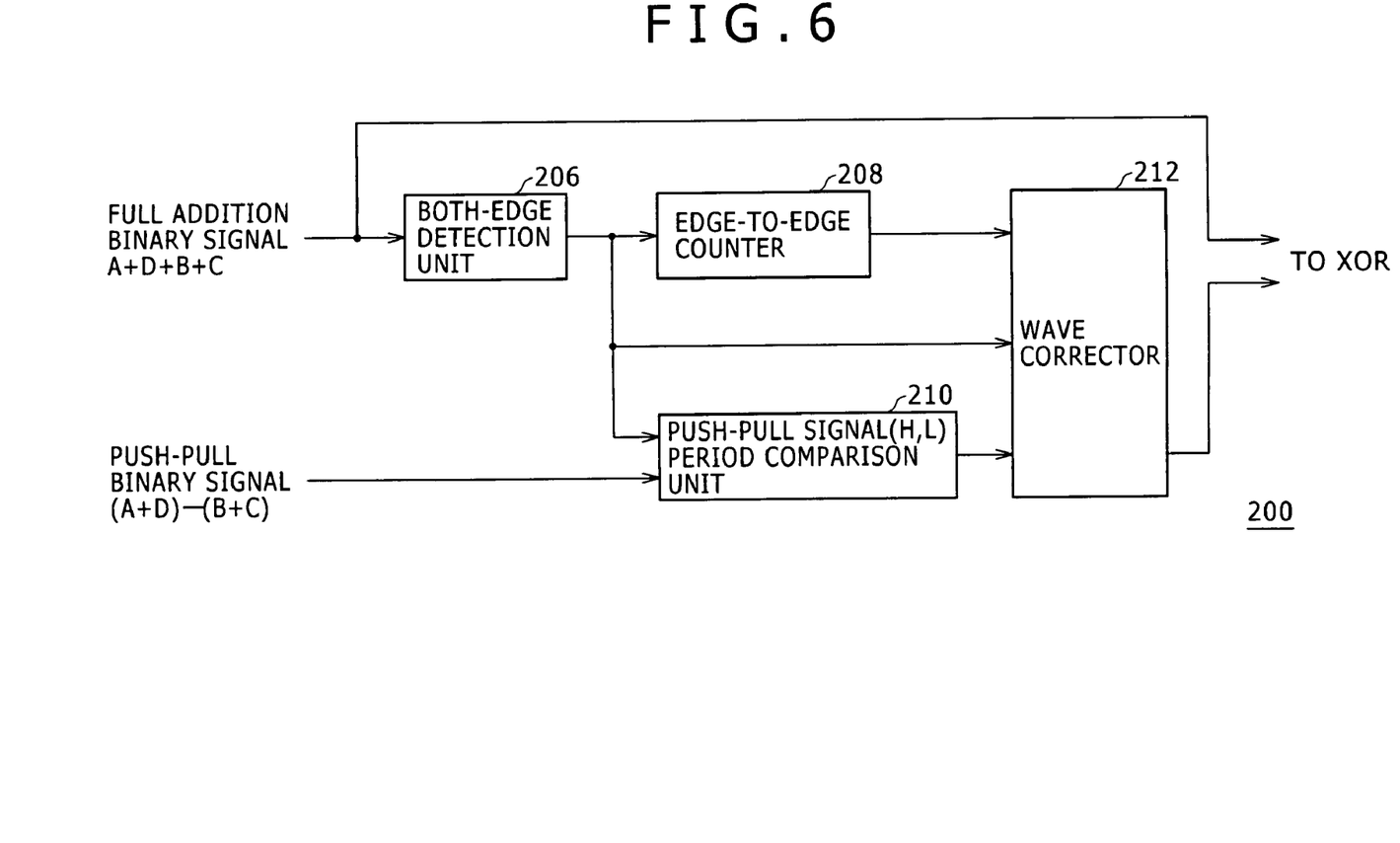
FIG. 6 is a block diagram illustrating more in detail the configuration of a push-pull wave correction block.

FIG. 6 is a block diagram illustrating more in detail the configuration of the push-pull wave correction block 200. As illustrated in FIG. 6, the push-pull wave correction block 200 includes a both-edge detection unit 206, edge-to-edge counter 208, push-pull signal (H, L) period comparison unit 210 and wave corrector 212. Here, the both-edge detection unit 206, edge-to-edge counter 208 and push-pull signal (H, L) period comparison unit 210 correspond to the pulse width detector 202 shown in FIG. 2. On the other hand, the wave corrector 212 corresponds to the wave corrector 204.

Figure 7A:
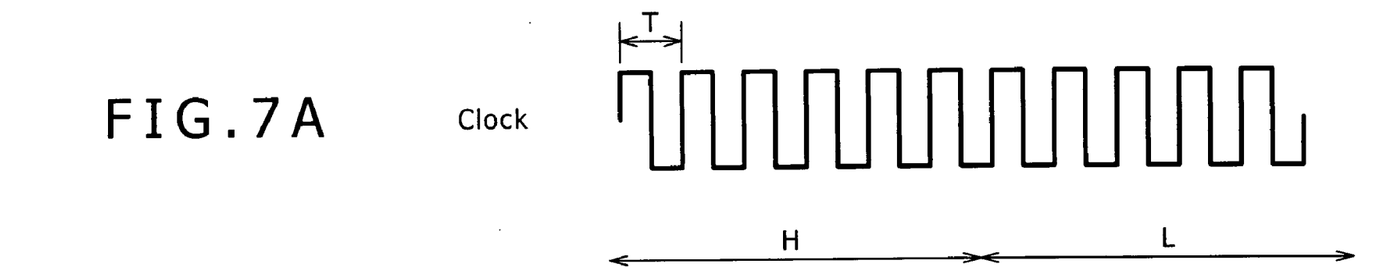
FIGS. 7A to 7C are schematic diagrams for describing wave correction performed by the push-pull wave correction block.
Figure 7B:
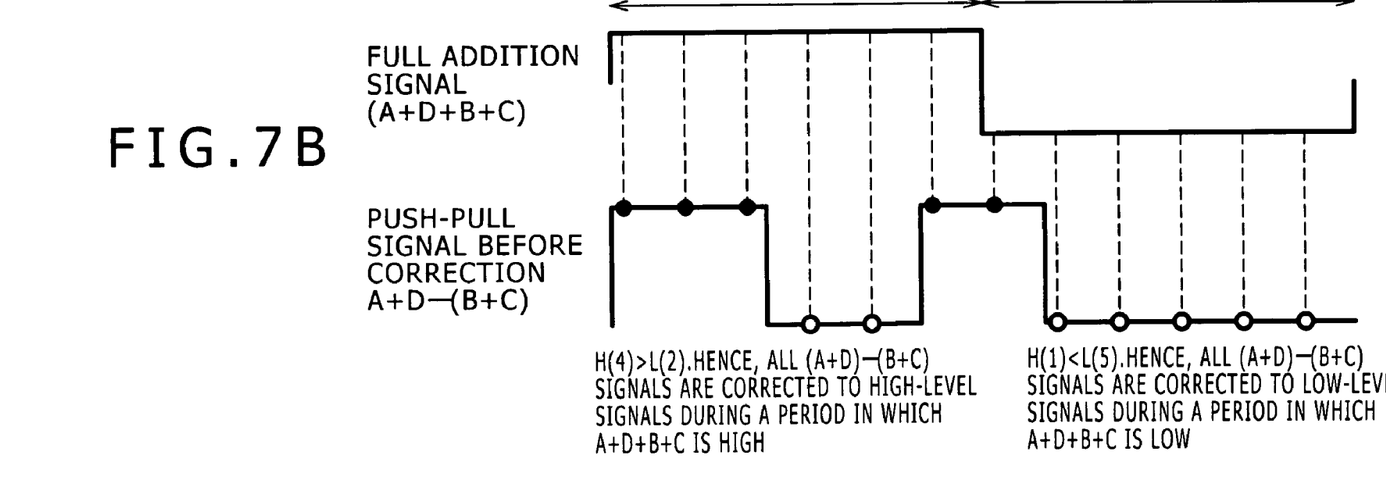
Figure 7C:
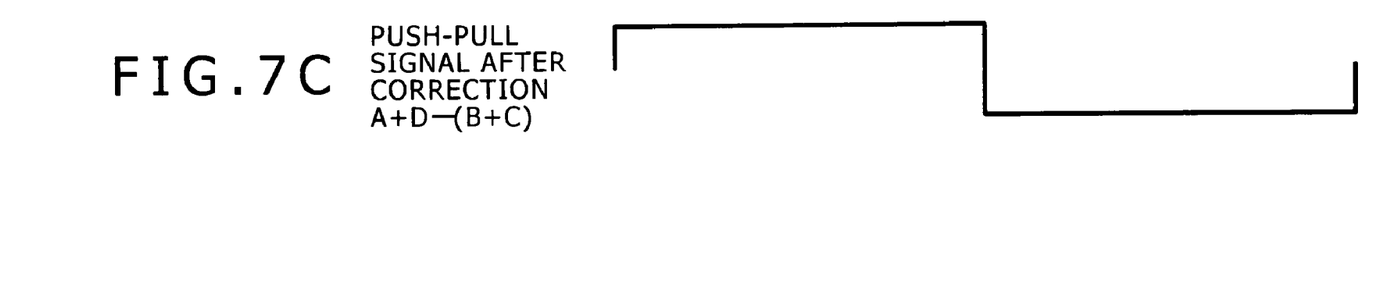

Further, FIGS. 7A to 7C are schematic diagrams for describing wave correction performed by the push-pull wave correction block 200. Here, FIG. 7A illustrates a clock pulse, and FIG. 7B the full addition signal and wobble signal after the binarization by the latch comparators 128 and 130. The wobble signal (push-pull signal) shown in FIG. 7B has yet to be corrected by the push-pull wave correction block 200. FIG. 7B illustrates a case in which $A+D \geq B+C$. On the other hand, FIG. 7C illustrates the wobble signal which has been corrected by the push-pull wave correction block 200.

The full addition signal R=A+B+C+D fed to the push-pull wave correction block 200 is fed to the both-edge detection unit 206 where a high-to-low or low-to-high transition edge of the full addition signal is detected. As a result, time periods H and L are detected during which the full addition signal is high and low, respectively, as illustrated in FIG. 7B.

After edges are detected by the both-edge detection unit 206, the edge-to-edge counter 208 counts, in number of clock pulses, the length of each of the time periods H and L during which the full addition signal is high and low, respectively.

Further, the push-pull signal (H, L) period comparison unit 210 compares, for each of the time periods H and L during which the full addition signal is high and low, respectively, the numbers of high- and low-level wobble signals based on the internal clock. As illustrated in FIGS. 7A to 7C, a detection is made, at the leading edge of the clock, as to whether the wobble signal is high or low for each of the time periods H and L. This provides the number of high-level wobble signals (number of black filled circles in FIG. 7B) and that of low-level wobble signals (number of white filled circles in FIG. 7B) for each of the time periods H and L.

The push-pull signal (H, L) period comparison unit 210 determines, by a majority decision, which of the high- and low-level signals in the time period H is more numerous than the other, thus determining the logic value. The wave corrector 212 corrects, based on the calculation result, all the wobble signal values in the time period H to the more numerous logic value. For the time period L, the push-pull signal (H, L) period comparison unit 210 similarly determines, by a majority decision, which of the high- and low-level signals is more numerous than the other. The wave corrector 212 corrects the wobble signal values in the time period L to the more numerous logic values FIG. 7B illustrates a case in which the time period H of the full addition signal is six clocks long. During this time period H, there are four high (black filled) wobble signals and two low (white filled) wobble signals. That is, there are more high-level signals than low-level ones. Therefore, the wave corrector 212 corrects all the wobble signals in the time period H to high-level signals. During the time period L, on the other hand, there are one high (black filled) wobble signal and five low (white filled) wobble signals. That is, there are more low-level signals than high-level ones. Therefore, the wave corrector 212 corrects all the wobble signals in the time period L to low-level signals.

As a result, the wobble signals can be corrected in each of the time periods H and L to high- or low-level signals even in the presence of variation in level of the wobble signals during these periods. This ensures synchronization of the high-to-low or low-to-high transition of the full addition signal with that of the wobble signal.

As described above, the wave corrector 212 corrects the wobble signal, synchronous with the edges of the full addition signal R, to the logic level which is more numerous of the two levels, i.e., high and low levels. FIG. 7C illustrates the corrected wobble signal from the wave corrector 212. As illustrated in FIG. 7C, the wobble signal is high during the time period H, and low during the time period L. As a result, error factors such as phase shift, noise and signal fluctuations can be eliminated even in the presence of error in the wobble signal.

This provides excellent wobble signal quality transmitted to the integrator 134 from the EXOR circuit 132, thus contributing to shorter integration time and significantly shorter adjustment time for wobble signal amplitude. Further, even after the balance adjustment of the wobble signal, the push-pull signal waveform is corrected. This positively suppresses the impact of wobble signal fluctuations, reliably preventing signal degradation due to fluctuations. Still further, even in the presence of phase shift already at the reading of the signal from the optical disk 300, the impact of phase shift can be corrected. This ensures positive elimination of error factors.

It should be noted that FIG. 7B illustrates a case in which $A+D \geq B+C$. However, the same processing is performed also when $A+D \geq B+C$. When $A+D \geq B+C$, there are more high-level signals than low-level ones during the time period H, and there are more low-level signals than high-level ones during the time period L. Therefore, the correction by the wave corrector changes the wobble signals to low-level signals during the time period H, and to high-level signals during the time period L, thus eliminating error factors from the wobble signals.

Figure 8:
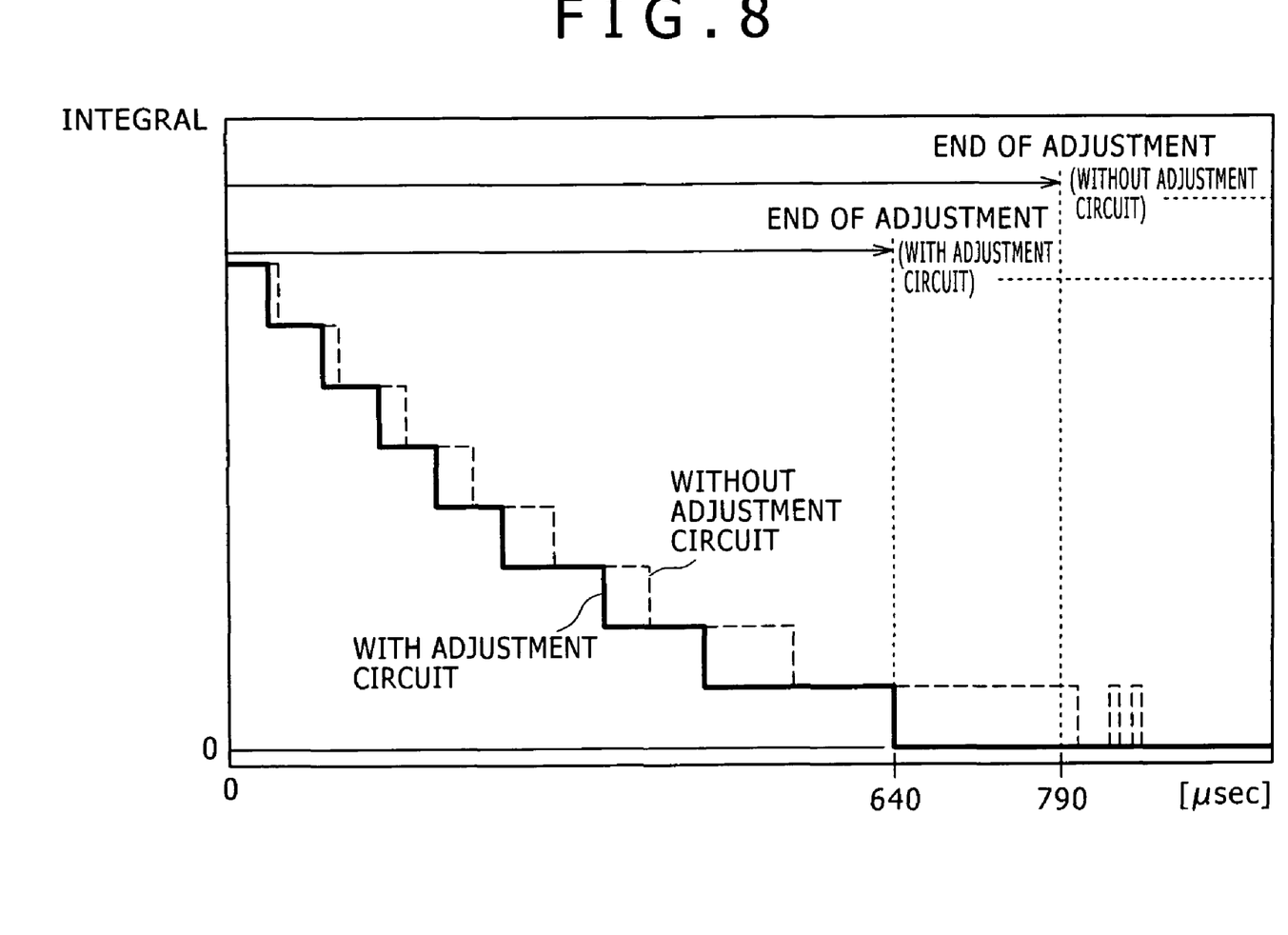
FIG. 8 is a characteristic diagram illustrating an advantageous effect of wave correction performed by the push-pull wave correction block.

FIG. 8 is a characteristic diagram illustrating an advantageous effect of wave correction performed by the push-pull wave correction block 200, showing the characteristics until the integral of the integrator 134 converges to 0. Here, the vertical axis represents an integral which takes on '1' when the output of the EXOR circuit 132 is high, and '−1' when the output thereof is low. The horizontal axis represents time. When the integral along the vertical axis is 0, the amplitude balance is in a converged state. The waveform shown by a solid line in FIG. 8 illustrates the characteristics when the waveform is corrected by the push-pull wave correction block 200. The waveform shown by a dashed line in FIG. 8, on the other hand, illustrates a case in which the push-pull wave correction block 200 is not provided and in which the outputs of the latch comparators 128 and 130 are fed to the EXOR circuit 132 in an as-is form.

The characteristic represented by the dashed line in FIG. 8 shows that it takes 790 μseconds for the integral to converge after the start of the amplitude balance adjustment. However, when the push-pull wave correction block 200 is provided, the integral converges in about 640 μseconds after the start of the adjustment. As described above, elimination of error factors from the wobble signal by means of the push-pull wave correction block 200 ensures that the integral decreases in one direction. This provides reduction in balance convergence time to about 80%, thus contributing to significantly reduced convergence time.

Figure 9:
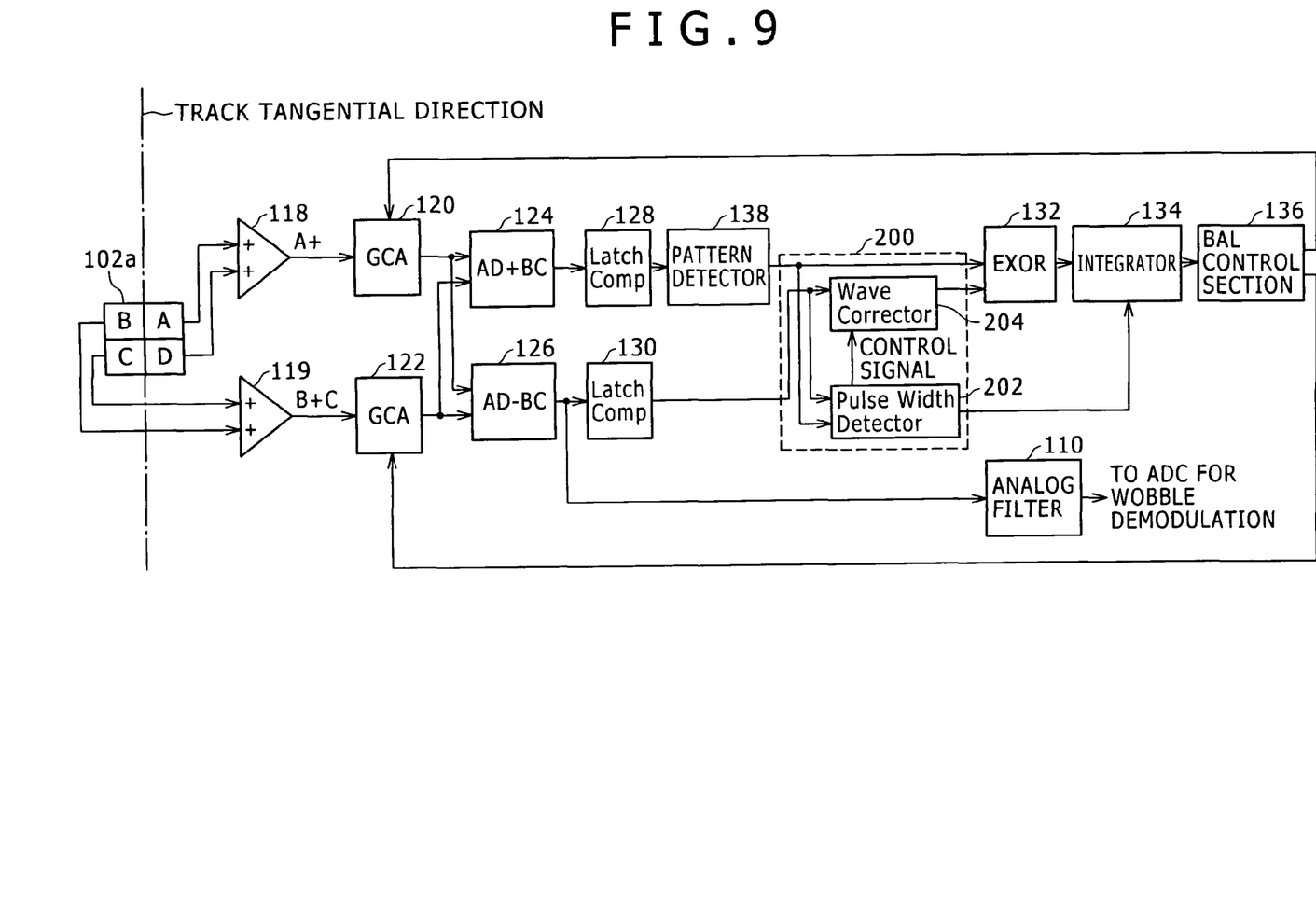
FIG. 9 is a schematic diagram illustrating another example of the wobble extraction circuit.

FIG. 9 is a schematic diagram illustrating another example of the wobble extraction circuit 108. In the circuit shown in FIG. 9, a pattern detector 138 is provided at the subsequent stage of the latch comparator 128. Other components of the circuit in FIG. 9 are the same as those shown in FIG. 2. The pattern detector 138 is capable of detecting the signal pattern of the full addition signal R and transmitting only the signal having a predetermined pattern length to the push-pull wave correction block 200.

For example, if the optical disk 300 is a Blu-ray disk BD, the pattern length of the full addition signal R for the time period H (or time period L) is defined by the standard to be from 2T to 9T (where T is one period of the clock pulse). The pattern detector 138 can remove signals having a predetermined pattern length from the input full addition signal R and transmit the resultant signal to the push-pull wave correction block 200. The pattern detector 138 can, for example, remove signals having a pattern length of 4T or more or transmit only signals with a pattern length of 3T to 6T to the subsequent stage. Here, removal of undesired patterns is likely to change the time it takes for the balance to converge. As a result, the patterns to be removed by the pattern detector 138 should preferably be adjusted to provide the shortest possible balance convergence time. Therefore, if the patterns to be removed by the pattern detector 138 are adjusted based on the standard or mode used (e.g., 2× speed mode) of the optical disk 300, the balance convergence time can be minimized in each of the standards and modes.

As described above, the present embodiment ensures suppression of external disturbances such as phase shift, noise and wobble fluctuations thanks to the push-pull wave correction block 200, thus providing excellent wobble signal quality transmitted to the integrator 134. This contributes to reduced integration time, thus providing significantly reduced adjustment time for wobble signal amplitude balance.

Although a preferred embodiment of the present invention has been described with reference to the accompanying drawings, it is needless to say that the present invention is not limited to this particular embodiment. It is apparent to those skilled in the art that various changes and modifications may be made without departing from the scope of the present invention, and it is understood that such changes and modifications are naturally included in the technical scope of the present invention.

The present application contains subject matter related to that disclosed in Japanese Priority Patent Application JP 2008-122556 filed in the Japan Patent Office on May 8, 2008, the entire content of which is hereby incorporated by reference.

What is claimed is:

1. A misjudgment correction circuit, comprising:
an edge detection section configured to detect, in a binarized full addition signal obtained by adding first and second signals of the same or opposite polarity, edges at which the logic value of the binarized signal changes;
a push-pull signal acquisition section configured to acquire a binarized push-pull signal obtained by subtracting the second signal from the first signal;
a clock pulse generation section configured to generate a uniform series of clock pulses;
a full addition signal H/L time periods detection section operative to determine a high time period of the binarized full addition signal and a low time period of the binarized full addition signal;
a push-pull signal H/L detection section operative to determine a number of high-level push-pull signals and low-level push-pull signals during the high time period for each clock pulse within the high time period of the binarized full addition signal and a number of high-level push-pull signals and low-level push-pull signals during the low time period for each clock pulse within the low time period of the binarized full addition signal;
a majority decision calculation section configured to calculate the total number of high-level push-pull signals and the total number of low-level push-pull signals in each one of the high time period and the low time period of the binarized full addition signal and to determine which one of either the high-level push-pull signals or the low-level push pull signals constitutes a majority of high-level or low-level push-pull signals within the high time period and the low-time period of the binarized full addition signal; and
a wave correction section configured to correct the push-pull signal by forming either a high-level signal or a low-level signal for each one of a push-pull high time period and a push-pull low time period of the push-pull signal corresponding to the high time period and the low time period of the binarized full addition signal as determined by the majority decision calculation section.

2. The misjudgment correction circuit of claim 1, wherein
the first and second signals are acquired by detecting reflected light from an optical recording medium with two separate photoreceiving sections which are separated from each other in the direction in which the tracks of the medium extend, and
the push-pull signal is a wobble signal based on the wobbles of the tracks.

3. A misjudgment correction circuit, comprising:
edge detection means for detecting, in a binarized full addition signal obtained by adding first and second signals of the same or opposite polarity, edges at which the logic value of the binarized signal changes;
push-pull signal acquisition means for acquiring a binarized push-pull signal obtained by subtracting the second signal from the first signal;
a clock pulse generation section for generating a uniform series of clock pulses;
a full addition signal H/L time periods detection means for determining a high time period of the binarized full addition signal and a low time period of the binarized full addition signal;
a push-pull signal H/L detection means for determining a number of high-level push-pull signals and low-level push-pull signals during the high time period for each clock pulse within the high time period of the binarized full addition signal and a number of high-level push-pull signals and low-level push-pull signals during the low time period for each clock pulse within the low time period of the binarized full addition signal;

majority decision calculation means for calculating the total number of high-level push-pull signals and the total number of low-level push-pull signals in each one of the high time period and the low time period of the binarized full addition signal and determining which one of either the high-level push-pull signals or the low-level push pull signals constitutes a majority of high-level or low-level push-pull signals within the high time period and the low-time period of the binarized full addition signal; and wave correction means for correcting the push-pull signal by forming either a high-level signal or a low-level signal for each one of a push-pull high time period and a push-pull low time period of the push-pull signal corresponding to the high time period and the low time period of the binarized full addition signal as determined by the majority decision calculation means.

\* \* \* \* \*